United States Patent [19]

Hollowell

[11] 4,433,775

[45] Feb. 28, 1984

[54] PUSHER ASSEMBLY FOR SCRAP METAL CONVEYORS

[75] Inventor: Barry S. Hollowell, Warrensville Heights, Ohio

[73] Assignee: Mayfran, Inc., Cleveland, Ohio

[21] Appl. No.: 265,037

[22] Filed: May 18, 1981

[51] Int. Cl.³ .................................................. B65G 25/00
[52] U.S. Cl. ........................................................ 198/742
[58] Field of Search ............... 198/732, 735, 741, 742, 198/746, 738, 716

[56] References Cited

U.S. PATENT DOCUMENTS

| | | | |
|---|---|---|---|
| 2,984,338 | 5/1961 | Pockman et al. | 198/741 |
| 3,112,025 | 11/1963 | Peras | 198/174 |
| 3,158,257 | 11/1964 | Peras | 198/221 |
| 3,175,677 | 3/1965 | Peras | 198/224 |
| 3,473,645 | 10/1969 | Kidd | 198/742 X |
| 3,659,702 | 5/1972 | Assauer | 198/221 |
| 3,747,742 | 7/1973 | Wissmann | 198/221 |
| 3,777,880 | 12/1973 | Becker et al. | 198/221 |
| 3,797,637 | 3/1974 | Wissmann | 198/221 |
| 3,799,329 | 3/1974 | Fitzpatrick | 198/221 |
| 3,802,552 | 4/1974 | Gann et al. | 198/218 |
| 3,828,920 | 8/1974 | Becker et al. | 198/221 |
| 4,026,408 | 5/1977 | Becker | 198/741 |
| 4,082,178 | 4/1978 | Van Nocker | 198/741 |
| 4,200,185 | 4/1980 | Van Nocker | 198/718 |

FOREIGN PATENT DOCUMENTS 2713303 10/1977 Fed. Rep. of Germany ...... 198/742

Primary Examiner—Joseph E. Valenza
Assistant Examiner—Dennis J. Williams
Attorney, Agent, or Firm—Body, Vickers & Daniels

[57] ABSTRACT

A pusher assembly is disclosed for a scrap metal conveyor of the type having an elongated trough in which the pusher assembly is supported for longitudinal reciprocation to advance scrap metal along the trough in the direction from one end thereof toward the other. The pusher assembly includes an elongate circular push rod carrying a plurality of scrap metal pusher elements axially spaced apart on the rod and supported thereon for reciprocation therewith and for pivotal movement about the rod axis. The pusher elements slidably engage a longitudinally extending wear plate on the bottom wall of the trough and are restrained against lateral displacement relative to the wear plate by a longitudinally extending upright guide bar thereon received in guide slots in the undersides of the pusher elements.

10 Claims, 4 Drawing Figures

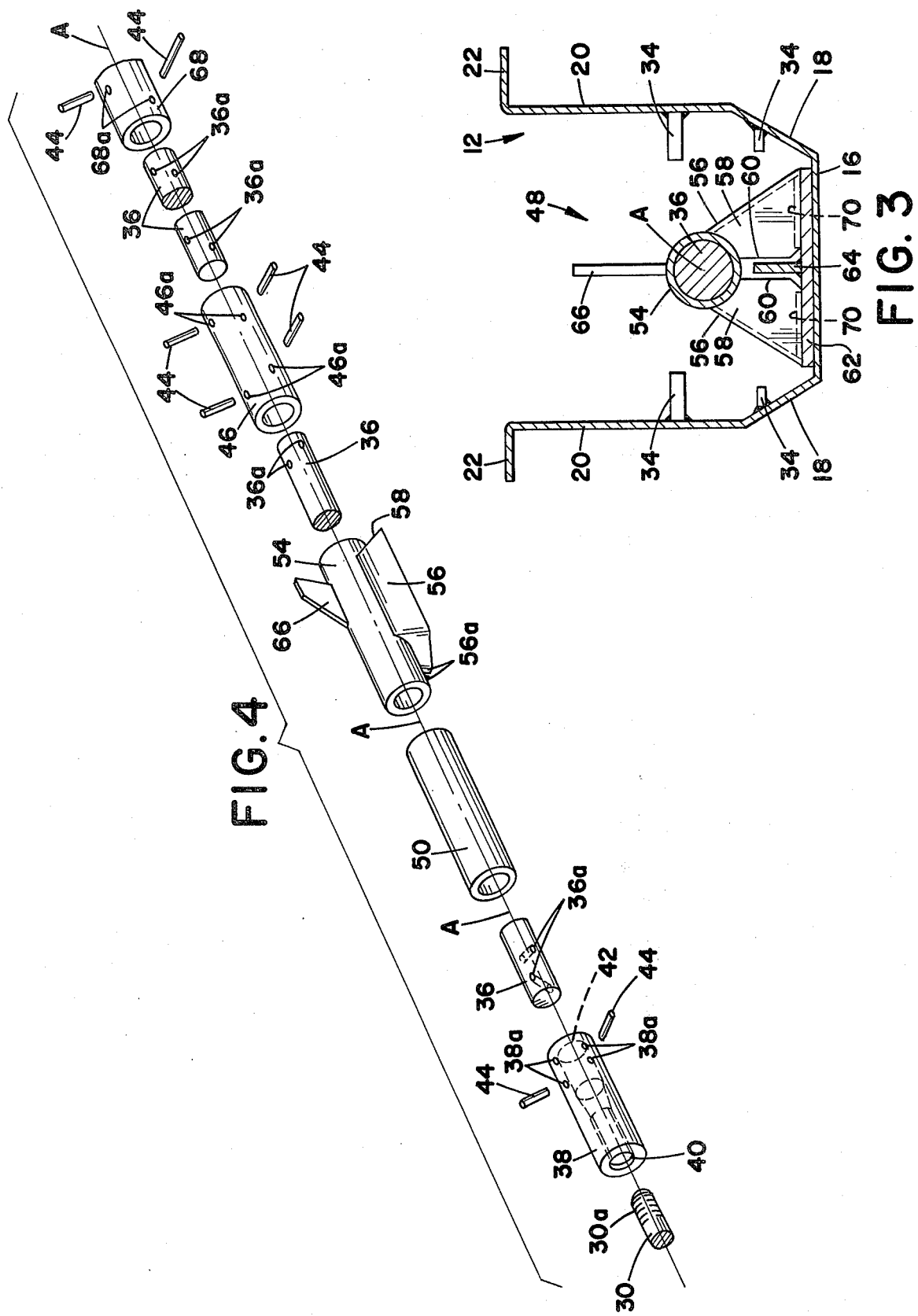

PUSHER ASSEMBLY FOR SCRAP METAL CONVEYORS

BACKGROUND OF THE INVENTION

This invention relates to the art of scrap metal conveyors of the type having an elongated trough in which a pusher assembly is supported for longitudinal reciprocation to advance scrap metal along the trough and, more particularly, to an improved pusher assembly for such a conveyor.

Scrap metal conveyors of the character having an elongate trough supporting a longitudinally reciprocable pusher assembly for conveying metal filings, turnings, and the like along the trough in the direction from one end thereof to the other are well known in the art. Generally, the pusher assembly in such a conveyor is comprised of a longitudinally extending push rod adapted to be reciprocated such as by a double acting hydraulic piston and cylinder unit at one end of the trough, and a plurality of pusher elements often referred to as plows axially spaced apart along the push rod and rigidly fastened thereto for displacement therewith. Often, the push rod is in the form of a longitudinally split tube, or an inverted V-shaped angle member, supported for longitudinal reciprocation and lateral guidance by a longitudinally extending support and guide assembly on the bottom wall of the trough. Examples of such previous arrangements are illustrated in U.S. Pat. Nos. 3,659,702 to Assauer and 3,777,880 to Becker et al which illustrate a split tube type push rod slidably supported on a circular support member disposed within the split tube, and U.S. Pat. Nos. 3,112,025 to Peras and 3,802,552 to Gann et al which illustrate inverted V-shaped push rods supported on underlying rollers and bearing plates, respectively. In other previous arrangements, such as those disclosed in U.S. Pat. Nos. 3,797,637 to Wissmann and 4,082,178 to VanNocker, the pusher elements or plows slidably engage a wear plate provided on the bottom wall of the trough.

In all of the pusher assemblies heretofore provided for scrap metal conveyors of the foregoing character, including those pusher assemblies specifically mentioned above, the pusher elements or plows are rigidly attached to the push rod member, or to an axially coupled assembly of push rod members, against displacement circumferentially of and relative to the push rod axis. This rigid relationship presents a number of problems in connection with the manufacture, maintenance and use of the pusher assembly and the conveyor apparatus. In this respect, the trough and pusher assembly may be fifty to one-hundred feet in length, and each may be comprised of axially coupled sections of ten feet, for example. It is extremely difficult to obtain and maintain alignment of the trough or trough sections, alignment of the support and guide components for the pusher assembly, and alignment of the pusher or plow elements relative to one another along a length of push rod. Warping of the trough circumferentially along the length thereof is not at all uncommon, and corresponding warpage of the support and guide arrangement accompanys such trough warpage. Such trough warpage and/or pusher element misalignment results in undesirable wearing interengagement between the component parts of the pusher assembly, the support and guide components therefor, and/or the conveyor's trough, and can result in the application of torsional forces on the push rod as a result of the latter being constrained to follow a circumferentially distorted path of reciprocating movement. Such torsional forces, in addition to causing undesirable wearing interengagement between the components of the pusher assembly and the support and guide components therefor, can transmit such torsional forces to the mechanism by which the pusher assembly is reciprocated. While such torsional forces may not be of considerable magnitude, the repeated imposition of such forces on the component parts reduces the life thereof and results in undesirable maintenance and replacement costs.

Additionally, with respect to those pusher assembly support arrangements wherein the push rod is supported on a circular support member or on bearing plates, a very small contact area exists between the push rod and the support components therefor, and this contact area cannot be easily lubricated. This, together with the weight of the pusher assembly results in rapid wear of both the push rod and the support component and thus an undesirably high replacement requirement. Further in connection with previous pusher assemblies and the periodically required maintenance and/or replacement of component parts thereof, the pusher elements or plows are generally welded or otherwise secured to a push rod section which may, for example, be ten feet long and carry five pusher elements or plows. If one such pusher element breaks or otherwise requires maintenance and/or replacement, maintenance without removal of the push rod section requires working on the element within the trough. This is not only inconvenient but can also be hazardous if welding is required and a flammable lubricant exists in the trough. If such inconvenience and/or danger is to be avoided, the damaged section of the pusher assembly must be removed from the trough. Such removal in connection with the pusher assemblies disclosed in the patents referred to hereinabove requires either sliding of the pusher assembly along the support and guide components and outwardly of the discharge end of the trough to achieve removal of the damaged section of the pusher assembly, or the separation of pusher assembly portions at the axially opposite ends of the damaged portion to achieve elevation and removal of the latter from the trough. In any event, such a removal procedure is time consuming and difficult. Even in such prior art arrangements such as those illustrated in U.S. Pat. Nos. 3,158,257 to Peras and 3,175,677 to Peras wherein adjacent short sections of the push rod assembly are pivotally coupled together, the pivotal coupling element is either not removable or, upon removal, does not enable elevation of the pusher element from the support and guide components, whereby either an elongated section of the push rod assembly must be removed from the trough, or the pusher elements must be removed from the end of the trough by sliding the elements along the support and guide components.

With regard to replacement requirements in connection with previously available pusher assemblies, if a pusher element or other component part on an elongate section of a push rod assembly is damaged beyond repair, replacement of an entire length of the push rod assembly is required. Such a pusher assembly having an unrepairable pusher element is most often totally lost in that the pusher element cannot be easily removed and reused. This is not only expensive, but requires the user to stock such elongate push rod sections. Still further, in those previous designs wherein the pusher elements or plows are welded on an elongate length of pusher bar, the pusher bar acts as a heat sink during the welding process causing excessive heat to be used. The pusher elements are often made of cast iron, and such heating during welding weakens the weld joint to the extent that the pusher element is easily broken loose therefrom, thus promoting maintenance and replacement requirements.

SUMMARY OF THE INVENTION

The foregoing disadvantages, and others, of pusher assemblies heretofore provided for use in scrap metal conveyors of the type described above are advantageoysly minimized or avoided by a pusher assembly in accordance with the present invention. More particularly in this respect, a push rod assembly in accordance with one aspect of the present invention provides for the pusher elements to be reciprocable with and circumferentially pivotal relative to the axis of a push rod. Thus, the pusher elements are self-aligning with respect to one another and with respect to the contour of the conveyor trough, whereby circumferential distortion of the trough along the length thereof does not result in the imposition of excessive wear interengagement between the component parts of the pusher assembly and the support and guide assembly therefor, or the imposition of torsional forces on the push rod. In accordance with another aspect of the present invention, a number of pusher elements are pivotally supported on a given length of push rod in axially spaced apart relationship along the length thereof and in a manner whereby the pusher elements are slidably removable from either end of the push rod. This advantageously enables removal, maintenance and/or replacement of an individual pusher element to be quickly and conveniently achieved, and avoids having to replace an entire length of the pusher assembly in the event that one of the pusher elements is damaged beyond repair. Further, where repair of a push rod element is possible, the damaged element can readily be removed and replaced and the conveyor put back into operation, enabling the necessary maintenance work to be achieved after removal and with minimum down time for the conveyor. Still further, in a push rod assembly comprised of a number of lengths of elongate push rods axially coupled to one another, the present invention in accordance with another aspect advantageously enables removal of a pusher element from one of the push rod lengths by disconnecting a coupling at one of the opposite ends of the rod without disturbing the coupling at the other end thereof and without complete removal of the length of rod from the conveyor trough. All of these features simplify maintenance and replacement operations and minimize the time required therefor, thus to reduce maintenance costs and down time for the conveyor apparatus and for the machinery with which the apparatus is associated thus increasing the production rate with regard to such machinery. Additionally, the replacement capability with respect to the pusher elements advantageously reduces space requirements for stock piling replacement parts, as well as the cost of replacement parts and losses incured through replacement of an entire pusher assembly section as a result of unrepairable damage to one pusher element.

In accordance with a preferred embodiment of the invention, the bottom edges of the pusher or plow blades of the pusher elements slidably interengage a wear plate on the bottom wall of the conveyor trough, whereby the pusher assembly is slidably supported by the wear plate. This optimizes the bearing surface interengagement between the pusher assembly and wear plate and provides exposed bearing surfaces for lubrication either by lubricant carried into the trough with the material being conveyed or lubricant introduced into the trough specifically for lubricating the bearing surfaces, which optimum bearing surface area and lubrication capability optimizes the useful lives of the wear plate and pusher elements.

It is accordingly an outstanding object of the present invention to provide an improved pusher assembly for scrap metal conveyors of the type in which a pusher assembly is longitudinally reciprocable in a conveyor trough to achieve conveyance of scrap metal therealong.

Another object is the provision of a pusher assembly of the foregoing character structured to be supported and guided within the trough in a manner which minimizes the imposition of undesirable wear and/or torsional forces on the component parts of the conveyor assembly.

Yet another object is the provision of a pusher assembly of the foregoing character in which the pusher elements are self-aligning with respect to the path of movement thereof in opposite directions along the trough.

A further object is the provision of a pusher assembly of the foregoing character in which one or more pusher elements are supported on a longitudinally reciprocable push rod for reciprocation therewith and for circumferential pivotal movement relative to the push rod axis.

Still a further object is the provision of a pusher assembly including a longitudinally reciprocable push rod carrying a plurality of pusher elements which are axially slidably removable from the push rod.

Yet a further object is the provision of a pusher assembly of the foregoing character comprised of a plurality of axially aligned and coupled push rod sections each supporting a plurality of pusher elements for longitudinal reciprocation therewith and for circumferential pivotal movement about the rod axis, and wherein the rod sections are separable to facilitate removal of the pusher elements from an uncoupled rod section.

Still another object is the provision of an improved pusher assembly of the foregoing character which minimizes component part wear, thus to increase the useable life of the component parts and minimize maintenance and replacement costs.

Still a further object is the provision of a pusher assembly of the foregoing character which minimizes the time required to achieve maintenance and/or replacement operations, minimizes down time for the conveyor apparatus with which it is associated, and which is economical to produce and use and highly efficient in use.

BRIEF DESCRIPTION OF THE DRAWINGS

The foregoing objects, and others, will in part be obvious and in part pointed out more fully hereinafter in conjunction with the written description of a preferred embodiment illustrated in the accompanying drawings in which:

FIG. 3 is a cross-sectional elevation view of the conveyor and pusher assembly taken along line 3—3 in FIG. 1; and FIG. 4 is an exploded perspective view showing the component parts of the pusher assembly.

DESCRIPTION OF A PREFERRED EMBODIMENT

Figure 1:
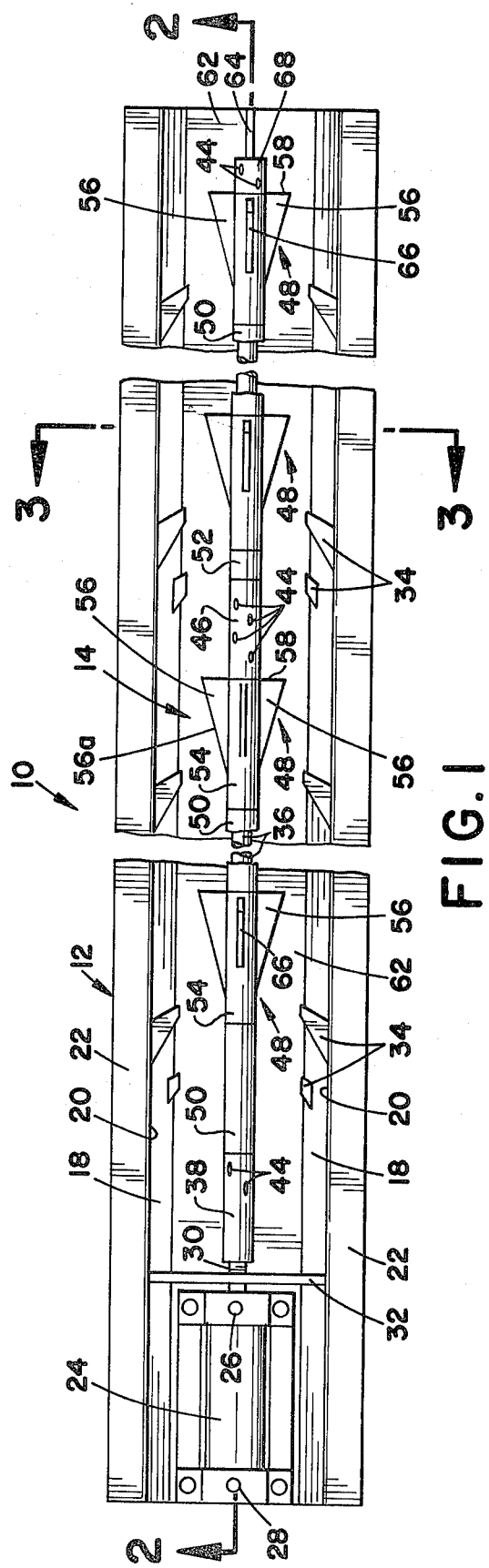
FIG. 1 is a plan view of a scrap metal conveyor including a pusher assembly according to the present invention.
Figure 2:
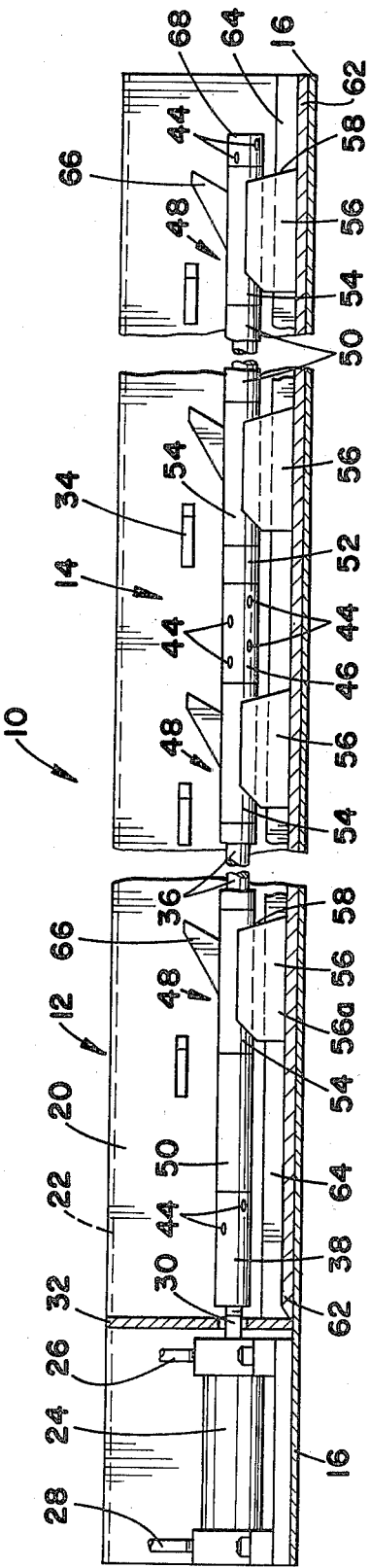
FIG. 2 is a sectional elevation view of the conveyor and pusher assembly taken along line 2—2 in FIG. 1.

Referring now in greater detail to the drawings, wherein the showings are for the purpose of illustrating a preferred embodiment of the invention only and not for the purpose of limiting the invention, FIGS. 1-3 illustrate a scrap metal conveyor 10 comprised of an elongated conveyor trough 12 and a pusher assembly 14 supported therein for reciprocation longitudinally of the trough to achieve the conveyance of scrap metal in the direction from left to right in FIGS. 1 and 2. As is well known in the art, trough 12 may be of considerable length and defined by a plurality of axially aligned and interconnected trough sections providing, between the opposite ends thereof, a bottom wall 16 and side walls extending along the opposite sides of the bottom wall and including upwardly and outwardly inclined lower side wall portions 18 and upright upper side wall portions 20 terminating in laterally outwardly extending flanges 22. The end portion of trough 12 at the entrance end thereof with respect to the direction of material movement through the trough supports a drive mechanism for pusher assembly 14 which, in the embodiment illustrated, is defined by a hydraulic piston and cylinder drive unit including a cylinder 24 suitably mounted and supported on bottom wall 16 of the trough. Cylinder 24 houses a piston, not illustrated, which is axially reciprocable in opposite directions within cylinder 24 by means of hydraulic fluid under pressure alternately introduced into flow lines 26 and 28 opening into cylinder 24 on axially opposite sides of the piston. A piston rod 30 has its inner end fastened to the piston for reciprocation therewith and has its outer end extending through an opening in a transverse wall 32 in the trough and coupled, as described in detail hereinafter, to pusher assembly 14. Accordingly, it will be appreciated that the pusher assembly is longitudinally reciprocable relative to trough 12 in response to operation of the hydraulic drive unit. As is further well known in this type of conveyor, the side walls of the trough are provided with a plurality of barbs or spurs 34 spaced apart along the length thereof to restrain return movement of material being conveyed during return movement of the pusher assembly 14 with respect to the direction of conveyance.

With reference now to FIG. 4 in connection with FIGS. 1-3, pusher assembly 14 includes an elongate push rod defined by axially aligned push rod components 36. The push rod components may be of any desired axial length, and each of the axially opposite ends of the push rods is provided with an axially spaced apart and perpendicular pair of bores 36a to facilitate a releaseable coupling arrangement between longitudinally adjacent push rod components and between the push rod defined thereby and the drive unit for the pusher assembly. In this respect, the push rod component adjacent the hydraulic drive unit is releaseably interengaged with piston rod 30 by means of a coupling sleeve 38 having an internally threaded bore 40 for interengagement of the sleeve with the externally threaded outer end 30a of piston rod 30. The opposite end of sleeve 38 is provided with an axially extending circular bore 42 to receive the end of the adjacent push rod 36, and the sleeve is provided with an axially spaced apart and perpendicular pair of bores 38a each aligned with a corresponding one of the bores 36a through the end of rod component 36 when the rod end is introduced into bore 42. A pair of coupling pins 44 extend through the aligned bores to releaseably couple sleeve 38 and the adjacent rod component 36, and pins 44 are removably associated with the sleeve and rod end, such as providing for a press fit interengagement between the pins and bores. Longitudinally adjacent ones of the push rod components 36 are similarly releaseably coupled together by means of a coupling sleeve 46 therebetween. Sleeve 46 has a circular bore therethrough receiving the ends of the longitudinally adjacent push rod components, and each of the opposite ends of the coupling sleeve is provided with a pair of axially spaced apart and perpendicular bores 46a. Bores 46a at each end of sleeve 46 are aligned with a corresponding one of the bores 36a on the end of the axially adjacent push rod component 36 when the ends of the push rods are introduced into sleeve 46, and the sleeve and push rod components are releaseably coupled by coupling pins 44 received in the aligned bores.

Each of the push rod components 36 is adapted to receive a plurality of pusher blade assemblies 48 which are supported on the rod component for the pusher blades thereof to be circumferentially pivotal relative to the push rod axis A. In the embodiment illustrated, pusher blade assemblies 48 are spaced apart along the corresponding push rod component 36 by means of spacer sleeves 50 therebetween and, in the event coupling sleeves 46 are not of an axial length corresponding to spacer sleeves 50, a short spacer sleeve 52 is interposed between coupling sleeve 46 and an adjacent pusher blade assembly to provide for uniform spacing between the pusher blade assemblies adjacent the coupled ends of the push rod components. While only one pusher blade assembly 48 and spacer sleeve 50 is shown in the exploded view of FIG. 4 for purposes of simplifying the latter Figure, it will be appreciated from FIGS. 1 and 2 that each push rod component 36 has a plurality of pusher blade assemblies and spacer sleeves associated therewith.

In the embodiment illustrated, each of the pusher blade assemblies 48 includes a tubular support sleeve 54 which is circular in cross section providing for the pusher blade assembly to be axially slidably received on the corresponding push rod component 36 and to be circumferentially pivotal about the axis of the push rod component. Each pusher blade assembly further includes pusher blade plate components welded on laterally opposite sides of support sleeve 54, each including a downwardly and laterally outwardly extending side plate portion 56, and a laterally inwardly extending plate portion 58 at the front end of the pusher blade assembly with respect to the direction of conveyance. The laterally inner edges 60 of the front plate portions are laterally spaced apart, and the trailing ends of side plate portions 56 converge with respect to a vertical plane through body portion 54 and terminate in inner edges 56a which are laterally spaced apart a distance corresponding to that of edges 60. In the preferred embodiment, the bottom edges of the pusher blade plate portions slidably engage a wear plate 62 on bottom wall 16 of the conveyor trough and which extends along the length thereof, and which wear plate accordingly supports the pusher assembly 14 for reciprocation relative to the trough. The laterally spaced apart edges 60 between front plate portions 58 and the laterally spaced apart rear edges 56a of side plate portions 56 provide guide slots beneath support sleeve 54 at the opposite ends of the pusher blade plates. Longitudinal guidance and support against lateral displacement of pusher assembly 14 during reciprocation thereof is achieved by means of an upright guide bar 64 welded or otherwise secured to wear plate 62 and which is longitudinally coextensive therewith and interposed between the guide slots defined by edges 60 and 56a. Each pusher blade assembly 48 may further include an upright axially forwardly extending barb or spur plate 66 on the upper side of support sleeve 54 to facilitate movement of material in the direction of conveyance along the conveyor trough.

In the preferred embodiment, spacer sleeves 50 are tubular components circular in cross section and axially slidably received on the corresponding push rod component 36. Sleeves 50 are of a length to provide the desired spacing between adjacent pusher blade plates and, preferably, sleeves 50 and coupling sleeves 46 are of the same outer diameter as support sleeve 54 so as to provide a smooth outer surface along the length of pusher assembly 14. After a number of push rod components 36, pusher blade assemblies 48 and spacer sleeves 50 have been assembled to provide a pusher assembly of desired length, a coupling sleeve 68 is releaseably coupled with the outer end of the push rod of the assembly to retain the pusher elements and spacer sleeves on the corresponding push rod component. Such coupling is achieved in a manner similar to that described hereinabove with respect to coupling sleeves 38 and 46 and, in this respect, coupling sleeve 68 is provided with a pair of axially spaced apart and perpendicular bores 68a. Bores 68a are aligned with bores 36a on the end of the corresponding push rod when the latter end is received in sleeve 68, enabling the bores to receive corresponding coupling pins 44.

It will be appreciated from the foregoing description that actuation of the hydraulic drive unit is adapted to impart reciprocation to pusher assembly 14 in longitudinally opposite directions relative to conveyor trough 12, whereby scrap metal in the conveyor is progressively displaced from left to right in FIGS. 1 and 2. It will be further appreciated that pusher blade assemblies 48 provide for the pusher blades thereof to have a circumferentially floating relationship with respect to the corresponding push rod component 36, whereby the bottoms of the pusher blade plates are adapted to continuously engage wear plate 62 during reciprocation of the pusher assembly enabling the pusher blades to follow the path provided by wear plate 62. Therefore, should the latter be circumferentially distorted along the length of conveyor trough 12, pusher blade assemblies 48 will circumferentially pivot relative to push rod axis A thus avoiding the imposition of any torsional forces on the push rod and any uneven wear between the bottoms of the plow blade plates and wear plate. It will be further appreciated that the component parts of a push rod assembly as described hereinabove are adapted to be readily and easily assembled to provide a pusher assembly of desired length and, once assembled, are adapted to be readily disassembled in part to achieve removal of a pusher blade assembly for repair or replacement thereof and without complete removal of either the pusher assembly in its entirity or a pusher rod section thereof. In this respect, for example, if it is desired to remove a pusher blade assembly 48 from the push rod component 36 coupled to piston rod 30, it is only necessary to decouple one or the other of the opposite ends of the push rod from the corresponding coupling sleeve 38 or 46 by removal of coupling pins 44 therefrom. Then, the decoupled portion of the pusher assembly can be slidably displaced toward the discharge end of the conveyor trough a distance sufficient to provide clearance for removal of the pusher blade assemblies and spacer sleeves from the push rod. Thereafter, it is only necessary to remove those pusher blade assemblies and spacer sleeves required to achieve removal of the pusher blade assembly which is to be repaired or replaced. Likewise, it will be appreciated that replacement of the removed pusher blade assembly and recoupling of the push rod component is readily achieved, whereby down time is minimized. Further, repair of a damaged pusher blade assembly can be achieved outside the environment of the conveyor, and such repair work can be achieved with minimum effort in that only a small component part of the entire assembly has to be handled and worked on. Still further, if the push rod components are in ten foot lengths and are capable for example of carrying five pusher blade assemblies and five spacer sleeves, it will be appreciated that stock piling of component parts is facilitated by the short lengths of the pusher blade assemblies and sleeves and by the absence of any permanent attachments projecting from the push rod component.

Further in connection with optimizing the bearing surface engagement between the bottoms of pusher blade plates 56 and 58 and wear plate 62 on the bottom wall of the trough, the plow blade plates can be made with laterally inwardly extending bottom plate portions, such as indicated by broken lines 70 in FIG. 3, providing planar surfaces of considerable area facially engaging the wear plate in the trough. Moreover, lateral guidance for the pusher assembly can be provided other than by guide bar 64, enabling such a bottom plate to be laterally uninterrupted so as to maximize the surface area thereof for engagement with wear plate 62 and minimize wear therebetween.

While considerable emphasis has been placed herein on the structure and the structural interrelationship between the component parts of a preferred embodiment of the pusher assembly, many embodiments of the invention can be made and many changes can be made in the embodiment herein illustrated and described without departing from the principles of the present invention. In this respect, for example, arrangements other than spacer sleeves can be employed for maintaining the pusher blades of the pusher blade assemblies in axially spaced relationship along a push rod component. For example, pins, split retaining rings, or the like, could be interengaged with the push rod at axially opposite ends of the support sleeves of the pusher blade assemblies to axially position the latter without interferring with the desired pivotal displacement thereof relative to the rod axis. As another example, the opposite ends of the support sleeves of the pusher blade assemblies could be axially extended for the extended portions of adjacent ones of the support sleeves to provide the spacing achieved with sleeves 50 in the preferred embodiment. Further, it will be appreciated that releaseable coupling arrangements other than the coupling sleeves described herein can readily be devised for releaseably connecting adjacent ones of the push rod components, retaining the component parts on the end-most one of the push rod components of the pusher assembly, and releaseably connecting the push rod to the drive mechanism for the assembly. Still further, it will be appreciated that the structure of the pusher blade portions of the pusher blade assemblies could be other than that herein illustrated and described and that the pusher blade assembly could be an integral casting in which case the bottom of the portion of the casting corresponding to the tubular support sleeve 54 would probably be open. It will be appreciated too in connection with the broader aspect of the invention relating to providing for circumferential pivotal displacement of the pusher blades relative to the axis of the push rod or its equivalent, such pivotal mounting could be achieved other than by the use of a tubular support sleeve received on the push rod component. It is only important in connection with this aspect of the present invention that the pusher blades be circumferentially pivotal relative to the push rod axis, and it will be appreciated that this could be achieved for example by pivotally interconnecting axially adjacent push rod components, or by mounting the pusher blades for pivotal movement about an axis parallel to but offset from the push rod axis.

Since many embodiments of the present invention can be made and since many changes can be made in the embodiment herein illustrated and described, including those embodiments and changes specifically referred to above, it is to be distinctly understood that the foregoing descriptive matter is to be interpreted merely as illustrative of the present invention and not as a limitation.

I claim:

1. A pusher assembly for a scrap metal conveyor having a trough including bottom wall means on which the pusher assembly is supported for longitudinal reciprocation to advance scrap metal along the trough between opposite ends thereof and means at one end of said trough to reciprocate said pusher assembly, said pusher assembly comprising rigid push rod means extending longitudinally along said trough, said push rod means being circular in cross-section and having an axis, a plurality of axially spaced apart scrap metal pusher means each supported on said push rod means for reciprocation therewith and against axial displacement relative thereto and for swinging circumferential pivotal movement relative to one another and to said push rod means, said swinging movement being restricted to a plane transverse to said axis, each said pusher means including pusher blade means and a tubular support sleeve for said blade means, spacer sleeve means between the support sleeves of axially adjacent ones of said pusher means and providing said axially spaced apart relationship therebetween, said support sleeves and said spacer sleeve means being axially slidably received on and removable from said push rod means, and means releaseably retaining said support sleeves and said spacer sleeve means on said push rod means.

2. The pusher assembly according to claim 1, wherein said push rod means includes a pair of push rod members having axially adjacent ends, and coupling means releaseably interengaging said adjacent ends.

3. The pusher assembly according to claim 2, wherein said coupling means is a coupling sleeve received on said adjacent ends.

4. The pusher assembly according to claim 3, wherein said means between axially adjacent ones of said pusher blade means includes said coupling sleeve between the ones of said pusher blade means on said adjacent ends of said pair of push rod members.

5. The pusher assembly according to claim 1, wherein said trough bottom wall means is planar and each said pusher means includes plate means on laterally opposite sides of said rod axis and having planar bottom means slidably engaging said planar bottom wall means.

6. The pusher assembly according to claim 5, wherein said plate means have bottom edges providing said planar bottom means.

7. The pusher assembly according to claim 5, wherein said plate means include side plates and said planar bottom means includes planar bottom plates extending laterally inwardly from said side plates.

8. The pusher assembly according to claim 1, wherein said trough bottom wall means is planar and each said blade means includes plate means on said tubular support sleeve on laterally opposite sides of said rod axis, said plate means having planar bottom means slidably engaging said planar bottom wall means.

9. The pusher assembly according to claim 8, wherein said plate means have bottom edges providing said planar bottom means.

10. The pusher assembly according to claim 8, wherein said plate means include side plates and said planar bottom means includes planar bottom plates extending laterally inwardly from said side plates.

* * * * *